(12) United States Patent
Shail et al.

(10) Patent No.: US 6,504,387 B1
(45) Date of Patent: Jan. 7, 2003

(54) ITEM DETECTION/INSPECTION ARRANGEMENT

(75) Inventors: Kenneth Victor Shail, Worcestershire (GB); Stephen Adrian Tolputt, Gloucestershire (GB)

(73) Assignee: Sparc Systems Limited, Worcestershire (GB)

( * ) Notice: Subject to any disclaimer, the term of this patent is extended or adjusted under 35 U.S.C. 154(b) by 0 days.

(21) Appl. No.: 09/623,294

(22) PCT Filed: Mar. 1, 1999

(86) PCT No.: PCT/GB99/00604
§ 371 (c)(1),
(2), (4) Date: Sep. 1, 2000

(87) PCT Pub. No.: WO99/45343
PCT Pub. Date: Sep. 10, 1999

(30) Foreign Application Priority Data

Mar. 5, 1998 (GB) .............................................. 9804535

(51) Int. Cl.[7] .......................................... G01R 27/04
(52) U.S. Cl. ...................................... 324/690; 324/658
(58) Field of Search ................................ 324/658, 661, 324/663, 666, 673, 690, 671; 177/1, 210 C (56) References Cited

U.S. PATENT DOCUMENTS 3,965,416 A * 6/1976 Friedman .................... 324/633
4,223,751 A * 9/1980 Ayers et al. ............. 177/210 C
4,461,363 A * 7/1984 Loy ............................... 177/1
4,710,757 A 12/1987 Haase ......................... 340/684
5,461,319 A * 10/1995 Peters ......................... 324/660
5,602,486 A * 2/1997 Novak ......................... 324/519
5,668,309 A * 9/1997 Codina et al. .............. 324/663

FOREIGN PATENT DOCUMENTS

EP 0 643 281 8/1994 ......................... 7/2

OTHER PUBLICATIONS

Motion of Charged particles in a Uniform electric Fields, p. 643, Physics for Scientist and Engineers, Third Edition.*

* cited by examiner

*Primary Examiner*—N. Le
*Assistant Examiner*—Vincent Q. Nguyen
(74) *Attorney, Agent, or Firm*—Wells St. John P.S.

(57) ABSTRACT

An item detection/inspection arrangement has at least four capacitor plates arranged together in at least two pairs of opposing or generally opposing plates to provide, in use, at least two intersecting electric fields, items passing through the fields, in use, producing respective signals/pulses dependent on the changes of capacitance for the pairs of plates, and processing for producing from the signals/pulses, detection/inspection data for the items.

35 Claims, 7 Drawing Sheets

ITEM DETECTION/INSPECTION ARRANGEMENT

CROSS REFERENCE TO RELATED APPLICATION

Priority is claimed from an earlier filed International Patent Application PCT/GB99/00604, filed Mar. 1, 1999, which was published in English, which in turn claims priority from Great Britain Application 9804535.4, filed Mar. 5, 1998, by Kenneth Victor Shail and Stephen Adrian Tolputt, entitled "Item Detection/inspection Arrangement".

TECHNICAL FIELD

This invention relates to an arrangement for detecting/inspecting items prior to them being packaged, and has particular application to pharmaceutical items, such as tablets, pills, capsules and the like.

BACKGROUND OF THE INVENTION

Item inspection arrangements, for example for inspecting tablets to establish if they are whole or broken to some degree, are known which utilise the passage of the tablets between two plates of a single capacitor. This results in a change of capacitance and a corresponding signal which is processed to provide an indication of the result of each inspection.

Figure 1:
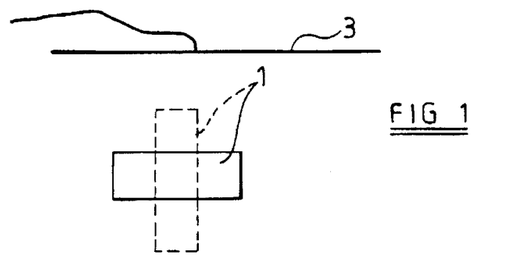
FIG. 1 is a schematic plan view showing rotation of an item about a vertical axis between two capacitor plates.

It has however been established that an item 1 having a rectangular plan, when disposed between parallel capacitor plates 2, 3, produces a varying increase in capacitance as it is rotated about a vertical axis (FIG. 1). Since the orientation of the item in space is random, there is a large error resulting from orientation. A secondary further effect disrupting the inspection is the 'end' effect, which reduces field density at the mid-point between the capacitor plates, compared to that nearer each plate. Accordingly the sensitivity to an item varies as the item is moved along a line perpendicular to the plates.

SUMMARY OF THE INVENTION

An object is to minimise or obviate these disadvantages by providing an improved detection/inspection arrangement.

An item detection/inspection arrangement of the invention comprises at least four capacitor plates arranged together in at least two pairs of opposing or generally opposing plates to provide, in use, at least two intersecting electric fields, items passing through said fields, in use, producing respective signals/pulses dependent on the changes of capacitance for the pairs of plates, and processing means for producing from said signals/pulses, detection/inspection data for said items.

As used herein, the reference to electric(al) fields 'intersecting' includes actual intersection i.e. by two or more fields which are together simultaneously in existence, and also spacial intersection, i.e. where the fields do not exist together at any time but, when they exist separately, are positioned in space (within the transducer) so that they would intersect if they did exist simultaneously. Accordingly it will be appreciated that the invention relates not only to the spacial intersections of the second embodiment described, where the plates are sequentially pulsed, but also to actual intersecting electric(al) fields as is the case with the first embodiment where the two pairs of plates are driven not in phase.

BRIEF DESCRIPTION OF THE DRAWINGS

The invention will now be described, by way of example, with reference to the accompanying drawings, in which:

FIG. 8 is a view like FIG. 6, illustrating an item falling in two alternative orientations between the plates with its longest dimension in the horizontal and the vertical respectively, FIG. 9 shows the D.C. output pulses for the two respective configurations of fall shown in FIG. 8.

DETAILED DESCRIPTION OF THE INVENTION

Figure 2:
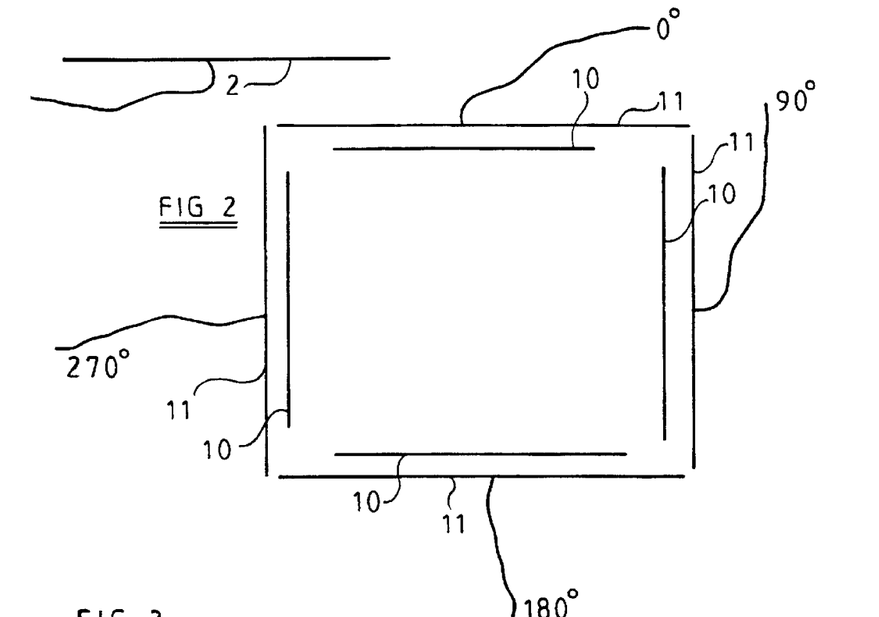
FIG. 2 is a schematic plan view of part of a detection/inspection arrangement of the invention.
Figure 3:
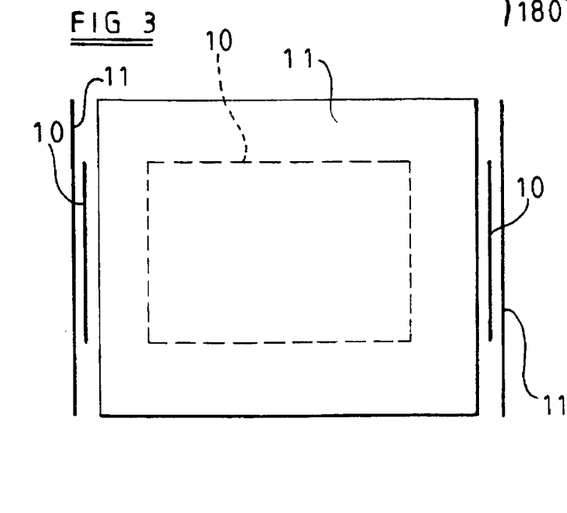
FIG. 3 is a side view of the FIG. 2 arrangement.
Figure 4:
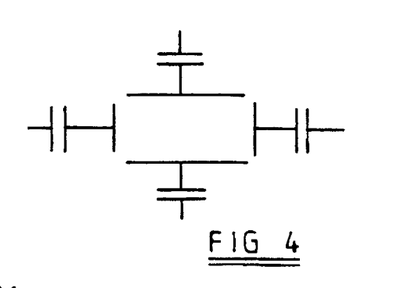
FIG. 4 is a diagram schematically showing the effective electrical network of the FIG. 3 arrangement.

The present invention provides a capacitative arrangement (hereinafter referred to as a transducer) for detecting/inspecting items in which the transducer's susceptibility to orientation of the item being measured is reduced. FIGS. 2 and 3 show one possible embodiment. In plan view there are four capacitor plates, each having an inner electrode 10 and an outer electrode 11. Each outer electrode is driven with a sine wave of the same frequency, but with a different phase, each being 90° shifted from the adjacent plate, as indicated. There are therefore two co-existent capacitors at right-angles to each other, providing respective electrical fields which intersect. However because their drive voltages and detection circuits are 90° out of phase they have practically no effect on each other. FIG. 4 shows the effective electrical network provided by the two capacitor arrangement.

Figure 5:
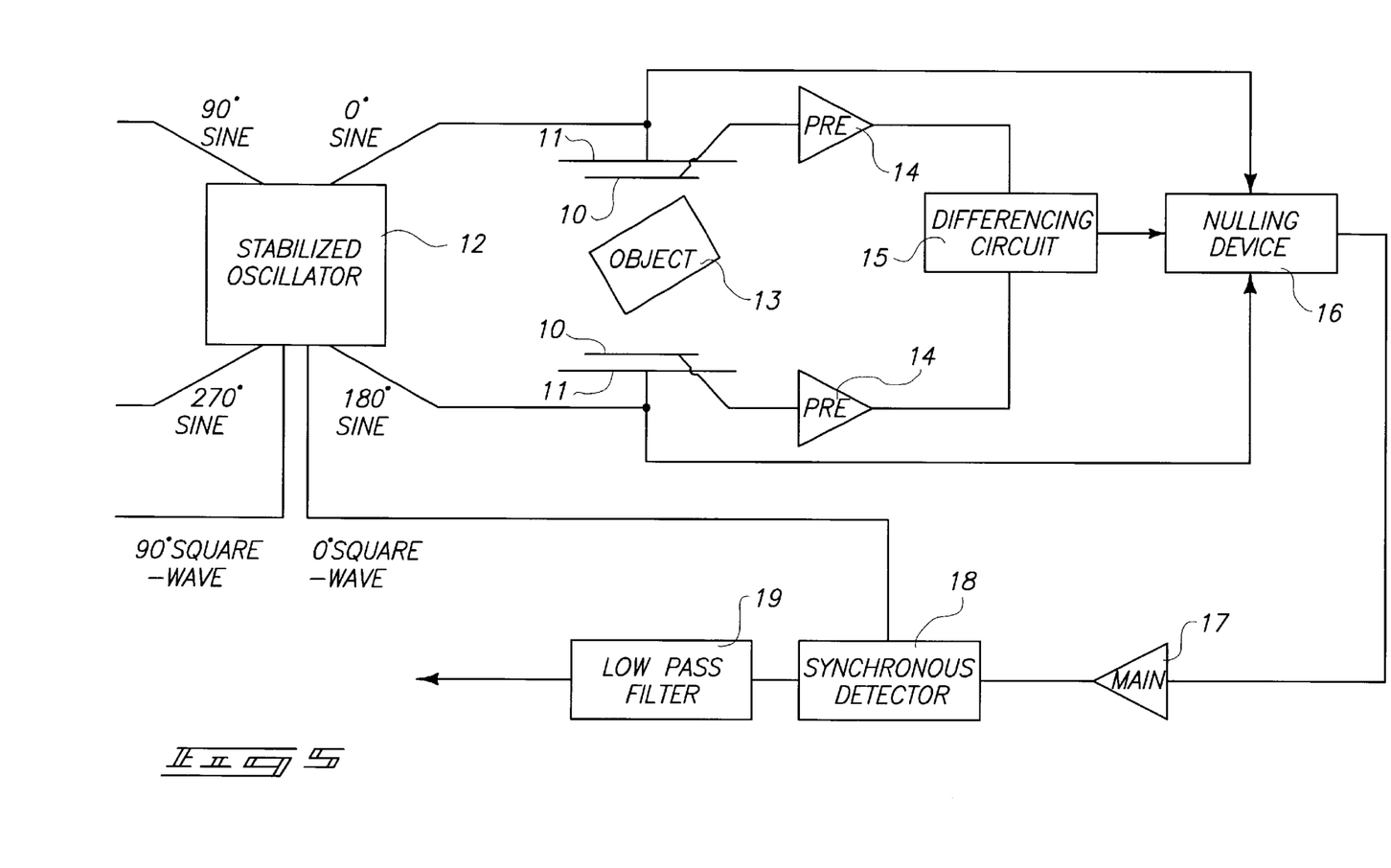
FIG. 5 is a circuit diagram of an arrangement of the invention, FIGS. 6 and 7 schematically show two side views respectively at 90° apart of an item rotated about a horizontal axis between a pair of capacitor plates in arrangement of the invention.

FIG. 5 shows a block diagram of one embodiment of an excitation and detection circuit for one pair of plates (e.g. the 0/180° pair). The circuit of the adjacent pair is substantially the same. It shares the same oscillator but uses the 90° and 270° signals, instead of 0° and 180°, where appropriate.

A stabilised oscillator 12 produces a sine wave at around 10 kHz. It has a 0° output and an 180° phase output. It also produces a 0° reference square wave with the same phase as the 0° sine wave. The 0° and 180° sine waves feed the outer electrodes 11 of the plates.

The inner electrodes 10 and the outer electrodes 11 form three series capacitors. The effect of an object/item 13 passing between the inner electrodes is slightly to reduce the voltage difference existing between them, i.e. the voltage across the centre capacitor. This change is small because of the relatively small initial capacitance and the much larger capacitance between inner and outer electrodes. In practice the inner and outer electrodes may be formed by areas of copper track on the two sides of electrically insulating means, for example a fibre-glass printed circuit.

The signal on each inner electrode 10 is at very high impedance and is immediately buffered by preamplifiers 14 which are mounted physically near to those electrodes. Their low impedance outputs are then fed to a differencing circuit 15 which produces an output signal resembling the difference in voltage between the inner electrodes. A following nulling device 16 subtracts most of the large standing signal which is present when no item is being measured. In practice the nulling circuit operates automatically by varying the amount of 0° or 180° sine wave which is added to the signal in order to produce a near zero output with no item present between the plates. Although not shown on the diagram it also subtracts any residual signal which is induced from the adjacent places by using a second synchronous detector which uses the 90° square wave as its timing reference. The output of the nulling circuit 16 passes through a main amplifier 17 to a synchronous detector 18. This produces a D.C. output which is proportional only to the in-phase signal. Any 90° signal is inherently ignored by it. The resulting D.C. output is largely proportional to the increase in capacitance caused by the item passing through the corresponding plates and largely unaffected by the adjacent plates. It is then passed to the subsequent device for analysis, possibly by way of a low-pass filter 19. There is a corresponding D.C. output from the circuit of the adjacent plates. In simple terms the subsequent device simply adds the two D.C. outputs together to produce a D.C. signal which is largely immune to rotation about the vertical axis.

Figure 6:
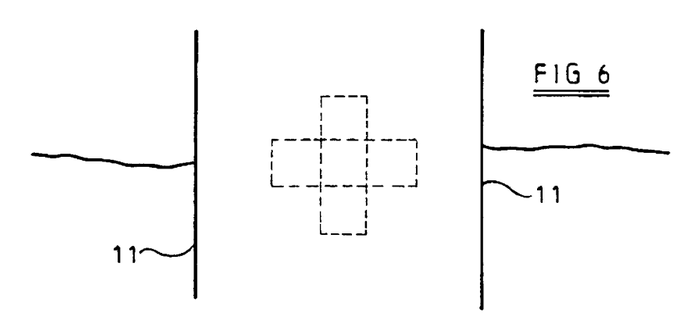
Figures 7, 8, 9:
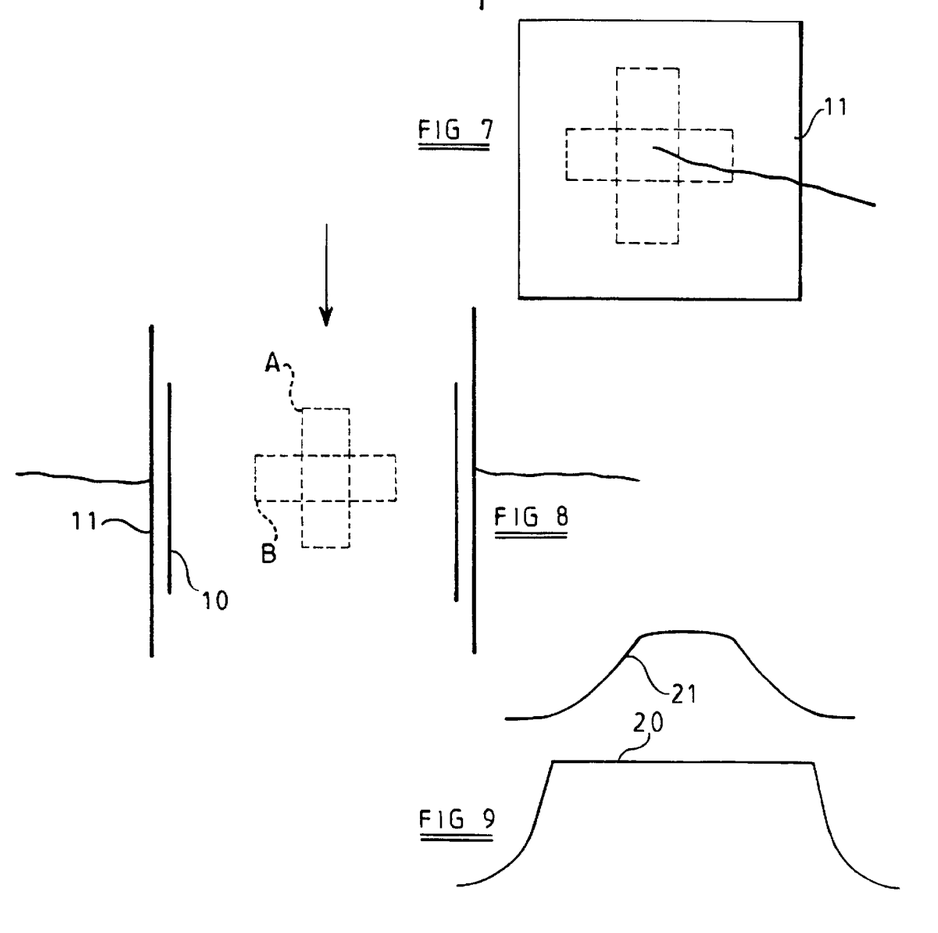

When considering the horizontal axes, reference is made to FIGS. 6 and 7 which shows two sides of a simple pair of plates and the rectangular object 13 being rotated about the two horizontal axes respectively. It can be seen by observation that the rotation in FIG. 7 will have no effect because of the symmetry of the plates about that axis. However the rotation in FIG. 6 is the same as that shown about the vertical axis. When visualising a second pair of plates being added to the arrangements of FIGS. 6 and 7, it can be seen that a rotation about each horizontal axis will produce nil effect in one pair and a finite effect in the other, depending on which horizontal rotational axis is being considered. A tablet or similar object which is falling with its longest dimension in the horizontal produces a higher and longer D.C. output pulse 20 than one 21 falling with its longest dimension in the vertical, as shown in FIGS. 8 and 9. The voltage is higher because of the rotation effect. The pulse is longer because the item spends more of is travel with its entirety between plates.

The two D.C. output signals/pulses are therefore capable of providing sufficient data in their pulse length and height to enable a subsequent processing device to discern the amount of material in an item largely irrespective of its orientation between the pairs of plates.

The two D.C. outputs are intended to be fed to respective Analogue to Digital converters which are both read by a microprocessor. The microprocessor will be programmed to memorise the combination of D.C. levels and pulse lengths which correspond to the different orientations of the same (perfect) item falling through the plates. For example a large batch (say 1000) known, perfect items will be fed through the plates sequentially and the magnitudes and pulse lengths of the two D.C. signals memorised for each item. When the unknown items are subsequently fed through the device the processor will compare the resulting D.C. levels and pulse lengths with the known ones for the perfect items, to determine if the item is recognised as being acceptable in volume.

None of the plates are connected to ground (zero volts) potential. This is to preserve symmetry and to equalise the effects of stray capacitance to the metal mass which in practice will surround the whole device. It is envisaged that a simpler device could be produced where one plate of each pair could be grounded, although it may produce inferior results.

The aforementioned problem of varying field density is largely solved by the respective outer electrodes being substantially larger than the inner ones. The bulge in the field occurs mainly at the edge of the outer electrodes instead of the inner ones. This is because the voltage across the inner electrodes is almost the same as that across the outer ones. The effect is therefore (roughly) reduced by the ratio of heights of the inner electrodes to the outer electrodes. The presence of the adjacent plate also serves to 'contain' the field from bulging.

The arrangement and driving of the outer plates 11 is such that each pair forms a screen to shield the inner plates 10 from influences external of the transducer thus preventing sensing of objects which are outside the transducer, and preventing cross-talk between adjacent transducers.

Instead of 4 plates, more could be used, preferably in pairs, for example four pairs may be suitable.

The arrangement is of course applicable to items which are not rectangular, e.g. circular tablets, tubular capsules or the like.

Whilst the first embodiment described above represents an improved arrangement in respect of rotation of the measured item about the vertical axis, the problem of rotation about the longitudinal and lateral axes in the horizontal plane of the transducer is not satisfactorily solved by measurement of the length of the pulse, as this can be affected by other factors, such as the velocity of the item.

Accordingly the second embodiment of the invention shown in FIGS. 10 to 17 relates to a further improved detection/inspection arrangement. As with the transducer described in relation to the first embodiment, the capacitive arrangement or transducer 22 is in the form of a box with an open top and an open bottom, having plates on all four sides thereof. However this embodiment has a different arrangement of plates, as well as a different method of excitation and of signal processing, and represents an alternative and improved method of attempting immunity from errors due to orientation of the object.

Figures 10, 11, 12:
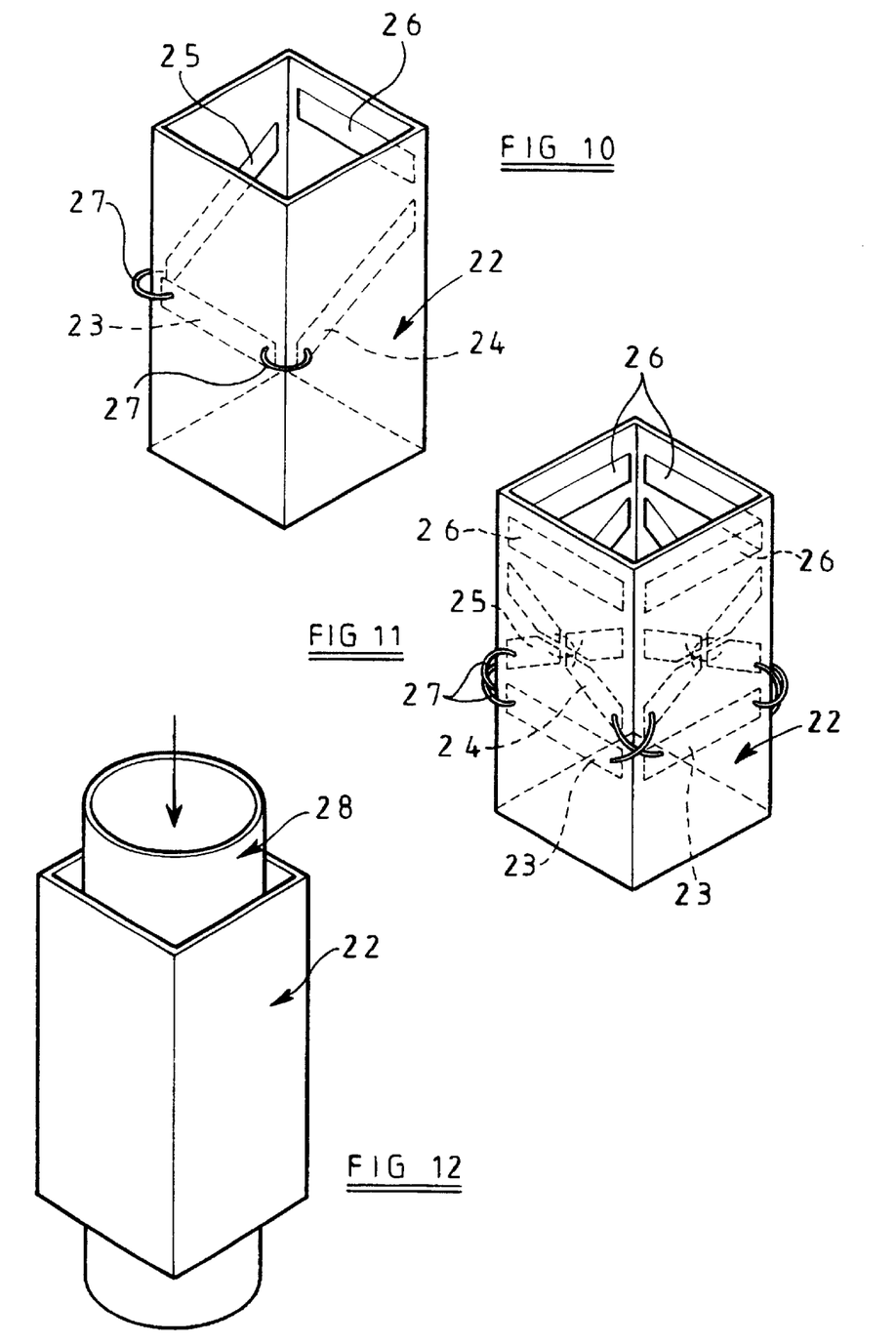
FIG. 10 is a perspective view of part of a transducer of a detection/inspection arrangement according to a second embodiment of the invention.
FIG. 11 is a similar view to FIG. 3, showing the complete transducer.
FIG. 12 is a perspective view of the transducer in use.

FIG. 10 shows, for simplicity, the arrangement of one set of plates only. All the plates are formed in a conducting material on the inner surface of electrically insulating means, such as a fibre-glass sheet. The outer surface of the sheet is largely covered with another conducting surface which is connected to ground, i.e. zero volts with reference to the remainder of the circuit. The plates on the inner surface can be considered to be equivalent to an inner electrode, with the outer conducting surface being equivalent to an outer electrode.

As shown in FIG. 10, there is a first plate 23 approximately half way down one of the sides, and second and third plates 24, 25 respectively on the respective sides of the transducer adjacent the side on which the plate 23 is disposed, the second and third plates extending upwardly from and relative to the first plate 23 to terminate just short of the remaining fourth side of the transducer, at which adjacent the open upper end thereof is disposed a fourth plate 26. All the plates are, in this embodiment, generally rectangular, and the second and third plates are electrically connected to the first plate as shown, these three plates being known as drive plates, the fourth plate being known as the sense plate. If required the plates could be tapered widthwise, i.e. be trapezoidal.

FIG. 11 shows the complete transducer which has four of the sets of plates shown in FIG. 2 around its four surfaces respectively. With this particular embodiment, the 'diagonal' plates on each face would pass through each other, and this would prevent them from having separate voltages. Thus each of the plates 24, 25 is divided at its centre, with there being connecting wires 27 as shown between the halves of each plate.

The arrangement in this embodiment thus produces four electrical fields which each slope at an angle to the horizontal, which angle is typically in the range 30° to 60°, and at the centre of the transducer, spacially intersect, i.e. they would actually intersect if produced at the same time rather than being produced by the drive plates being driven sequentially. With an angle in this embodiment of 45°, when an item to be measured rotates in space, it can never be more than 45° from the axis of any of the fields. In simple terms, the space at the centre of the transducer, where the four fields spacially intersect, now has much more effect than with the arrangement of the first embodiment, because the item is sensed four times, sequentially. When the resulting signals are added together, an item which is located at the centre can have up to four times the effect as one which only intersects one field. Accordingly a weakness of the first embodiment has been attended to. This centre sensitivity can then be increased or reduced more to equal that at other points, by adjusting dimensions of the plates, segmentation of the plates and voltages on the segments.

Since the sense plate 26 has a voltage which is very near to zero, and zero volts is also on the outer surface of the transducer, there is, to a large extent, only a voltage gradient in the space which is directly between the plates of each set. This brings some improvement over the earlier arrangement in which the field tended to bulge more in the vertical axis. As with the first embodiment, it is important that sensing only occurs within the area bounded by the plates. On a typical counting/grading machine there could be up to 20 such transducers mounted immediately against each other, in a line. It is therefore vital that the items falling through one transducer are ignored by any transducer which is adjacent to it. The transducers are therefore not simple capacitor plates which would inherently sense the space bounded by them and to a degree the space outside, due to fringing. The equivalent electrical circuit is therefore not a simple pair of plates for each axis but a multiplate network in which the outer electrodes are joined either to ground or a low impedance generator (voltage source) which has the same effect as a ground shield in containing the sensing area. Cross-talk between adjacent transducers is also prevented by this arrangement.

Although not described with the first embodiment, FIG. 12 shows how, in use, an item to be inspected/detected by a capacitative arrangement of both embodiments will pass through a guide, for example a polymer tube 28. Environment and pharmaceutical industry practices nowadays insist that there is some material between the transducer plates and the falling item. If the items are likely to come into contact with the insulating guide, the inspection/detection method would suffer from a build-up of static electricity on the surface of the insulating guide, which is required to be a good insulator in view of the sensing method. If it was slightly conductive, it would distort the electric field which is set up by the plates, to an extent which would destroy its measuring capability. The items passing through the tube will inevitably contact the inside thereof, and in doing so cause a build-up of free electrons on the inner surface, with the result that an electrostatic field is therefore formed. Subsequent items, also having free electrons at their surface, cause this field to be momentarily changed as they fall through it, and a resulting, interfering signal would be produced. The magnitude and form of that signal can be such that unwanted outputs can occur in most signal processing methods. Any insulating coating which is applied directly to the transducer's plates could suffer from the same problem with a build-up of static electricity. As will be described hereinafter, this problem is solved by the arrangement of the second embodiment.

Figure 13:
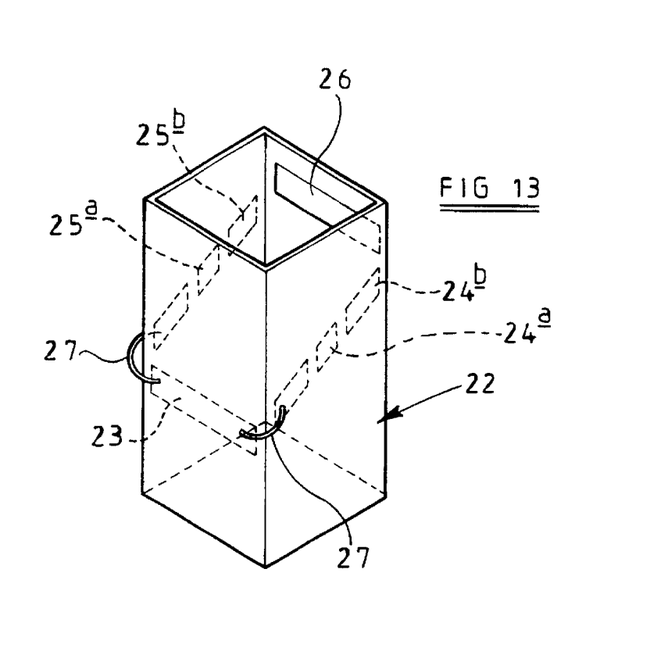
FIG. 13 is perspective view like FIG. 10 showing part of a transducer according to another embodiment, FIG. 14 schematically shows an arrangement of pulse means for driving the transducers of FIGS. 11 or 13.

As a refinement to the transducer arrangement shown in FIG. 11, any part of the drive plates can be arranged to have different voltages at different places along their lengths. This can be achieved by forming a plate from a resistive material, or by cutting it into sections and driving each section at a different voltage, for example as shown in FIG. 13. The voltage gradient which is so produced can be adjusted to trim the three-dimensional voltage field for optimum distribution of gradients. It is envisaged that this arrangement would be under processor control, so that different voltage patterns may be set-up to optimise the performance for different shapes of items, particularly pills.

Figure 14:
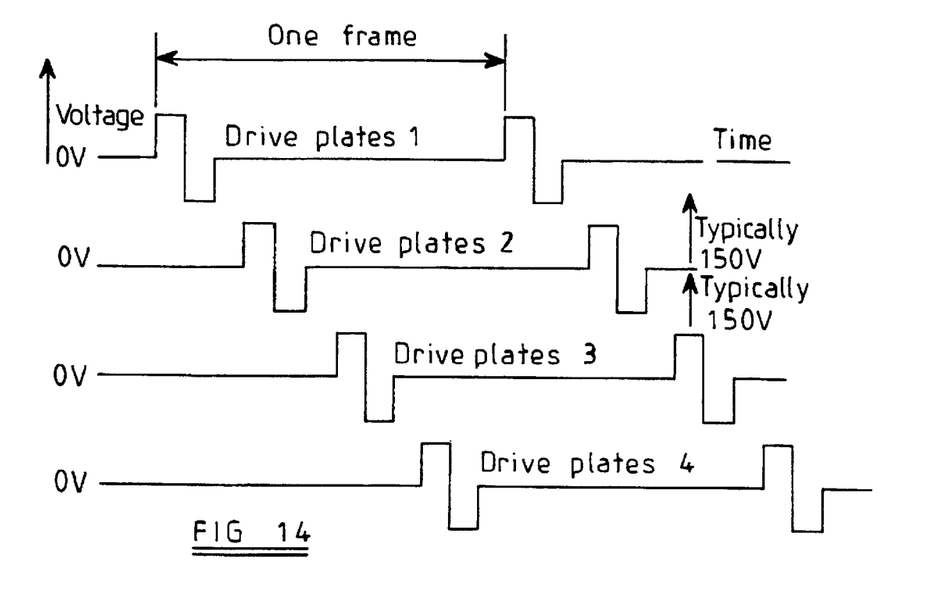

The four sets of drive plates, whether solid as shown in FIG. 11, or having gradient sections as shown in FIG. 13, are driven sequentially with high voltage pulses as shown in FIG. 14, one frame, for example, taking a little less than 1 millisecond. The waveforms are produced by (silicon) switches, which connect each plate to a positive high voltage and then a negative high voltage in turn. The switches are driven from a timing circuit shown in FIG. 15.

A different source voltage could be supplied to drive each plate section. Alternatively, one or more of the sections could be connected electrically to the voltage on plate 23 via resistors (or the like), to provide unequal potential along the sectioned plate with different resistance values.

In the example shown in FIG. 13, the whole excitation is applied to the horizontal drive plate 23 and proportions of it are applied through resistors to the gradient sections 24a, 24b and 25a, 25b. The could be any number of gradient sections and, at the limit, the whole drive plate (or plates) could be formed from a resistive material with its lowest potential point connected to ground, or a low voltage. In this way it would form both the electrode and the method of producing the gradient.

Figure 15:
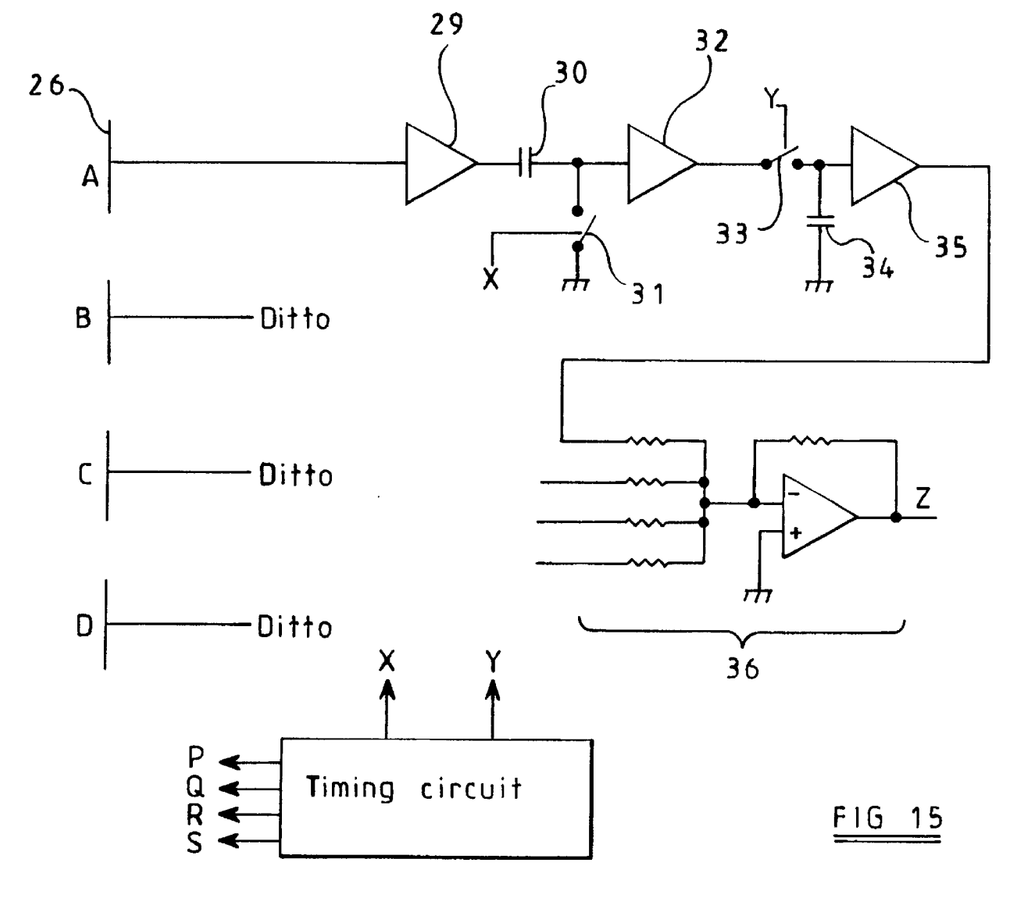
FIG. 15 shows a conditioning circuit with an associated timing circuit for producing said pulse means.
Figure 16:
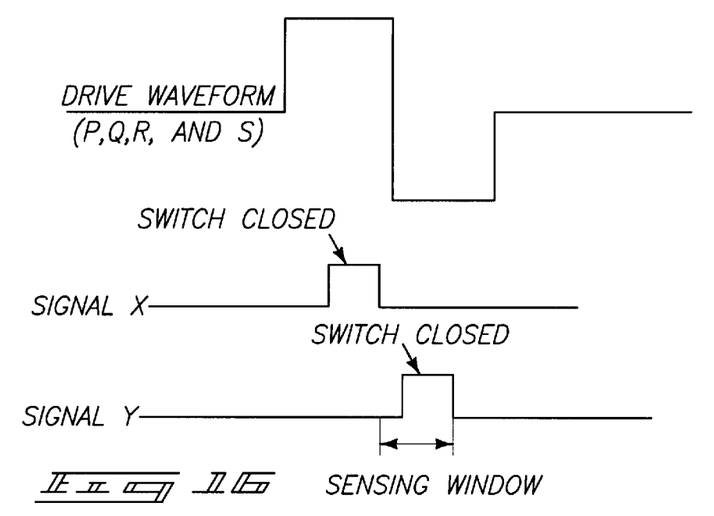
FIG. 16 shows schematically the relative timing of events for one set of capacitor plates for the transducer of FIG. 11 or FIG. 13.

FIG. 15 shows the signal processing circuit as well as the timing circuit and FIG. 16 shows the relative timing of the events concerning one set of plates.

The output of each sense plate is fed to a respective amplifier 29, which has an extremely high input impedance and low input capacitance so as not unduly to influence the voltage which is induced in the sense plate by its corresponding drive plate. The output of the amplifier 29 is then fed via a capacitor 30 to a switch 31. When the amplifier has had time to respond to the positive excitation voltage, switch 31 closes under the influence of signal X from the timing circuit. Capacitor 30 therefore charges to the corresponding output voltage of amplifier 29. Switch 31 opens after a short time leaving capacitor 30 holding the voltage to which it was charged and its right-hand end still at zero volts. When the excitation switches to a negative voltage, the right-hand end of capacitor 30 is driven, by amplifier 29, to a negative level which is equal to the peak-to-peak transition of the output of amplifier 29. Any quiescent voltage present at the output of amplifier 29 is not reflected in this voltage. This negative voltage is buffered by an amplifier 32 (which also has a very high input impedance) and fed to a switch 33. Very shortly after the transition in drive voltage, switch 33 closes for a few microseconds and transfers the output voltage of buffer amplifier 32 in to a capacitor 34. This is effectively a sample-hold circuit. The voltage in capacitor 34 is further buffered by an amplifier 35 so as not to drain it away during the remainder of the frame. The effect of this is to give a D.C. voltage on the output of buffer amplifier 35 which is proportional to the voltage induced in the sense plate by the capacitance between the drive and sense plates. Any item which comes between the drive and sense plate of that channel will cause a change in that induced voltage and therefore a corresponding change in the output voltage of buffer amplifier 4.

The other three channels of the transducer have corresponding elements and the four D.C. voltages are added together by a summing amplifier 36. It can therefore be seen that in rotating the item through any axis there will be a significant reduction in orientation errors as it intercepts the four fields.

Figure 17:
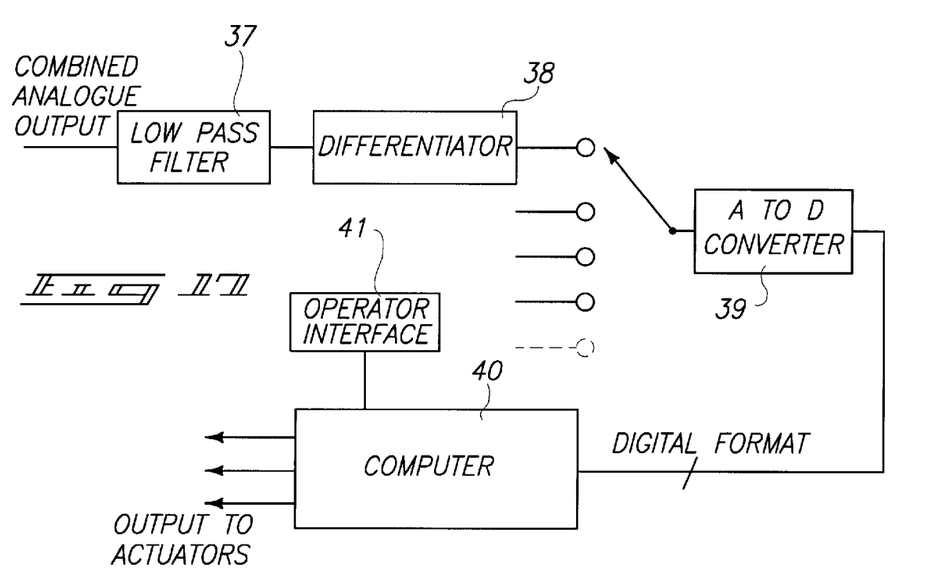
FIG. 17 is a block diagram of an arrangement of discriminating devices for processing signals from the processing circuit of FIG. 15.

The combined analogue output of the summing amplifier at Z is then (typically) passed to discriminating devices as shown in FIG. 17, comprising:

1) A low pass filter 37 to remove unwanted high-frequency fluctuations in the analogue signal.
2) A differentiator 38 or similar circuit to remove the quiescent voltage and leave only the change voltage which is caused by the presence of the item.
3) An optional multiplexor to enable multiple transducers to be sampled (if required).
4) An Analogue to Digital convertor 39.
5) A Computer, microcomputer, microprocessor or Digital Signal Processor (DSP) 40 to record the way that the changes in the combined analogue signal change with time and to decide if a particular item has sufficient material to be classed as an acceptable item or not, and give digital outputs in response to the amount of material which is in each item. These digital outputs can be used to energise actuators to divert defective items out of the main stream. It can also detect if two or more items have fallen through the transducer simultaneously and is able to batch acceptable items into groups having a predetermined quality.
6) An operator interface 41 to enable monitoring of the signal produced by each item and to enable setting-up of the parameters which are associated with accepting, rejecting, counting and batching the It is clear that the functions of the devices shown in FIG. 17 could be carried out by other means; indeed most of them by a computer, microprocessor, microprocessor DSP. The diagram is only indicative of the steps that may be taken to process the signal and act upon it. Such action is the rejection of detective items out of line and counting and batching of acceptable items.

A significant feature of this embodiment is the relatively high immunity to the effects of static electricity previously referred to. It has been determined by measurement that the signals resulting from this static electricity can vary at a rate of up to (typically) 2 volts per 100 microseconds (measured at the output of amplifier 29 in FIG. 15). The voltage and rate of change of voltage depend on many factors. This embodiment has significantly reduced the effect by the arrangement of the timing of switches 31 and 33 in FIG. 15. The only time when the circuit is receptive to the effects of static electricity is between the opening of switch 31 after closure and the opening of switch 33 after closure on each channel (shown as the "sensing window" on FIG. 16). This arrangement enables that window to be open for a very short time, typically 5 microseconds. During that time the voltage which is due to static electricity will have only changed by around 0.1 volts, compared by the required signal which has an amplitude of several volts.

As with the first embodiment, the transducer could have more than four sides.

In alternative arrangements:
1) The drive plates could be mounted on the outer surface of the wall material of the transducer, with the earth plate on the inside, the surface having windows in it to allow the field from the drive plates to pass through. This arrangement has particular practical advantages.
2. The drive plates could be excited with sine waves in a similar manner to the first embodiment and the signal conditioning could use phase-sensitive rectifiers.
3. The outputs of the separate buffer amplifiers in FIG. 15 could be fed directly to analogue-digital converters to enable them to be combined in the software of a computer, microcomputer, microprocessor or DSP.

Whilst described specifically in relation to the two embodiments of the invention relating to a detection/inspection arrangement with at least two intersecting electrical fields, the transducer arrangement described in which the sensing area is shielded/screened from influences external thereof is itself considered inventive per se and can be utilised in applications other than those described and illustrated herein.

What is claimed is:

1. An item detection/inspection arrangement comprising at least four capacitor plates arranged together in at least two pairs of opposing or generally opposing plates, forming at least two capacitive cells, to provide, in use, at least two intersecting electric fields, items passing through said fields, in use, producing respective signals/pulses dependent on the changes of capacitance for the pairs of plates, and processing means for producing from said signals/pulses, detection/inspection data for said items;

wherein one plate of each pair is a sense plate having a voltage induced thereat by the driving, in use, of drive plate means formed by at least said opposing or generally opposing plate of the pair;

wherein the drive plate means comprises at least one further capacitor plate, said opposing or generally opposing plate and said further plate being on respective sides of a transducer providing said intersecting electric fields, in use, said further plate being on a side of the transducer at an angle of 90° or greater to respective sides of the transducer on which are said sense plate and said opposing or generally opposing plate; and wherein the capacitor plates are formed from electrically conducting material on the inner surface of an insulating layer, which layer has its outer surface formed with electrically conducting material, said electrically conducting material of said outer surface, in use, being at a voltage which provides a screen to shield a sensing area of the transducer from items outside said area.

2. An arrangement as claimed in claim 1, wherein said further plate is electrically connected to said opposing or generally opposing plate to be at the same voltage thereas, in use.

3. An arrangement as claimed in claim 1, wherein said further plate is divided into separate sections arranged so that at least one plate section can be driven, in use, at a voltage different from that at which said opposing or generally opposing plate is driven, and different from that at which any other section or sections is or are driven.

4. An arrangement as claimed in claim 1, wherein said further plate is at an angle to a plane normal to the sides of said transducer, whilst said sense plate and said opposing or generally opposing plate are in respective planes normal to said transducer sides.

5. An arrangement as claimed in claim 1, wherein the drive plate means are formed from resistive material, its lowest potential point being connected, in use, to zero or low voltage.

6. An arrangement as claimed in claim 1, wherein said further plate is electrically connected to said opposing or generally opposing plate, so that it can be driven by a voltage different from that at which said opposing or generally opposing plate is driven, in use.

7. An arrangement as claimed in claim 6, wherein each electrically unconnected plate is formed from resistive material.

8. An arrangement as claimed in claim 7, including excitation means for applying a portion of an excitation voltage to the or each electrically unconnected plate.

9. An arrangement as claimed in claim 1, including material between the capacitor plates and said items passing through said fields, in use.

10. An arrangement as claimed in claim 9, wherein the material is an insulator.

11. An arrangement as claimed in claim 10, wherein the material is in the form of a tubular insulating guide.

12. An arrangement as claimed in claim 11, wherein the guide is a polymer tube.

13. An arrangement as claimed in claim 1, wherein the transducer is four sided, having said sense plate and said opposing plate on facing sides, and said further capacitor plate and a still further capacitor plate on the other sides, the still further plate being parallel or substantially parallel to said further plate, the plates on the four sides respectively providing one of said electric fields, in use.

14. An arrangement as claimed in claim 13, wherein said arrangement of four capacitor plates on the four sides of the transducer is repeated around the four sides of the transducer to provide, in use, four intersecting electric fields.

15. An arrangement as claimed in claim 14, wherein, each electric field, in use, is at an angle in the range 30° to 60° to a plane normal to the sides of the transducer.

16. An arrangement as claimed in claim 14, including drive means for driving, in use, the four sets of drive plate means sequentially with high voltage pulses which are positive and negative in turn.

17. An arrangement as claimed in claim 16, including a timing circuit which, in use, drives switch means which connect the drive plate means to said voltage pulses.

18. An arrangement as claimed in claim 1, including respective signal processing circuits to which respective output signals from the sense plates are fed, each of said circuits including an amplifier which produces an output, in use, which is proportional to the voltage induced in the sense plate by the capacitance between the sense plate and the drive plate means.

19. An arrangement as claimed in claim 18, including a summing amplifier to add together the D.C. voltages corresponding to the induced voltages from all the sense plates.

20. An arrangement as claimed in claim 19, including an analogue to digital converter to convert said summed D.C. voltages to a digital signal.

21. An arrangement as claimed in claim 20, including processor means to determine from said digital signal whether an item passing through said fields meets a predetermined material content requirement.

22. An arrangement as claimed in claim 18, including a capacitor via which, in use, the output from said amplifier is fed to a first switch which opens and closes so as to effect charging of said capacitor.

23. An arrangement as claimed in claim 22, including a buffer amplifier by which an output from the capacitor is buffered, in use, and fed to a second switch which opens and closes to feed the output from the buffer amplifier to a further capacitor.

24. An arrangement as claimed in claim 23, wherein the voltage in said further capacitor is buffered by said amplifier to produce, in use, said output, in the form of a D.C. voltage.

25. An arrangement as claimed in claim 23, wherein the time between the opening of the first switch and the opening of the second switch is minimized so as to counter the effect of any static electricity on the inner surface of said material.

26. An arrangement as claimed in claim 1, wherein the plates define two co-existent capacitors at right angles to one another, each capacitor plate having an inner electrode and an outer electrode.

27. An arrangement as claimed in claim 26, including an oscillator which, in use, for each capacitor drives the respective outer electrodes thereof with sine waves 180° out of phase, the outer electrodes of one capacitor being drive 90° out of phase with the outer electrodes of the other capacitor.

28. An arrangement as claimed in claim 27, including respective signal processing circuits to which a change in capacitance between the inner electrodes of the respective capacitors is fed to produce an output signal from each circuit dependent upon the amount of material in the item passing through said fields.

29. An arrangement as claimed in claim 28, wherein each circuit includes amplifiers which buffer respective signals from the inner electrodes of one of the capacitors, in use, and a differencing circuit which produces an output signal related to the difference in voltage between the inner electrodes of said one of the capacitors.

30. An arrangement as claimed in claim 29, including a nulling device.

31. An arrangement as claimed in claim 30, including a synchronous detector which, in use, receives an amplified output from the nulling device to produce said output signal.

32. An arrangement as claimed in claim 31, wherein said output signal is a D.C. output proportional only to the in-phase signal.

33. An item detection/inspection arrangement comprising at least four capacitor plates arranged together in at least two pairs of opposing or generally opposing plates provide, in use, at least two intersecting electric fields, items passing through said fields, in use, producing respective signals/pulses dependant on the changes of capacitance for the pair of plates, and processing means for producing from said signals/pulses, detection/inspection data for said items;

wherein one plate of each pair is a sense plate having a voltage induced thereat by the driving, in use, of drive plate means formed by at least said opposing or generally opposing plate of the pair;

wherein respective signal processing circuits are coupled to respective output signals from the sense plates, each processing circuit including an amplifier which produces an output, in use, which is proportional to the voltage induced in the sense plate by the capacitance between the sense plate and the drive plate means; and wherein the output from the amplifier, in use, is coupled via a capacitor to a first switch which opens and closes so as to effect charging of said capacitor.

34. An arrangement as claimed in claim 33, including a buffer amplifier by which an output from the capacitor is buffered, in use, and fed to a second switch which opens and closes to feed the output from the buffer amplifier to a further capacitor.

35. An arrangement as claimed in claim 34, wherein the voltage in said capacitor is buffered by said amplifier to produce, in use, said output, in the form of a D.C. voltage.

* * * * *